United States Patent [19]

Hafner

[11] 3,783,289

[45] Jan. 1, 1974

[54] MARX SURGE PULSER HAVING STRAY CAPACITANCE WHICH IS HIGH FOR INPUT STAGES AND LOW FOR OUTPUT STAGES

[75] Inventor: Michael P. Hafner, McMinnville, Oreg.

[73] Assignee: Field Emission Corporation, McMinnville, Oreg.

[22] Filed: June 14, 1972

[21] Appl. No.: 262,706

[52] U.S. Cl. .................... 250/417, 250/418

[51] Int. Cl. .................... H05g 1/24

[58] Field of Search .................... 250/98, 93, 102, 250/87, 417, 418

[56] References Cited

UNITED STATES PATENTS

| | | | |
|---|---|---|---|
| 3,256,439 | 6/1966 | Dyke et al. | 250/98 |
| 3,309,523 | 3/1967 | Dyke et al. | 250/102 |

*Primary Examiner*—James W. Lawrence
*Assistant Examiner*—B. C. Anderson
*Attorney*—Stephen W. Blore et al.

[57] ABSTRACT

A high voltage pulse generator of the Marx surge type is described in which the stray shunt capacitance to ground associated with the first several spark gaps of the input stages is of a higher value than the stray capacitance associated with the spark gaps of the output stages. The high stray capacitance of the input stages increases the amount of over-voltage transmitted to succeeding gaps when earlier gaps break down which enables a wider pressure range between the self fire and no fire pressures of the gas in the spark gaps. However, by providing a low stray capacitance for the output stages the pulser is still capable of producing high voltage output pulses of a narrow width and fast rise time. These different stray capacitances are provided by placing a grounded metal sleeve of smaller diameter than the pulser housing around the first few storage modules forming the input stages of the pulser, while leaving the last few storage modules forming its output stages free of any such sleeve. As a result, the storage modules of such output stages are spaced from the grounded metal housing by a greater distance than the spacing between the input modules and such sleeve to provide a lower stray capacitance for the output modules than for the input modules.

10 Claims, 6 Drawing Figures

MARX SURGE PULSER HAVING STRAY CAPACITANCE WHICH IS HIGH FOR INPUT STAGES AND LOW FOR OUTPUT STAGES

BACKGROUND OF THE INVENTION

The subject matter of the present invention relates generally to high voltage pulse generators employing storage capacitors which are discharge through spark gaps, and in particular to Marx surge pulsers including storage modules containing such storage capacitors and charging inductors which are arranged in a stack with their spark gaps positioned along a common light path to enable ultraviolet light coupling between the gaps. The pulser of the present invention is provided with a stray shunt capacitance between the storage modules and ground which is high for the input modules and low for the output modules to give improved performance. The pulser of the present invention is especially useful for supplying high voltage, high current pulses of narrow width to X-ray tubes of the field emission cathode type to enable pulsed vacuum arc operation of such tubes. However, such pulser can also be employed for other purposes not associated with X-ray tubes.

Marx surge pulsers operate by charging a plurality of storage capacitors in parallel through isolating inductances with a D.C. current source of intermediate voltage, and discharging such capacitors in series through spark gaps when such gaps break down, to produce an output pulse of much greater voltage, as discussed in Chapter 4 of the book *High Voltage Laboratory Technique*, by J. D. Craigs and J. M. Meek, pages 111 to 151, published in 1954. A compact portable Marx surge pulser employing a stack of storage modules each containing storage capacitors, isolating inductances and associated spark gap electrodes with the spark gaps positioned along a common light path for ultra-violet light coupling is shown in U.S. Pat. No. 3,256,439 of W. P. Dyke et al., granted June 14, 1966.

Usually with most Marx surge pulsers only the first spark gap is triggered to cause breakdown while the remaining spark gaps are caused to break down by the increased voltage applied thereto when the preceding gap breaks down, which is referred to as "overvoltage breakdown." The additional voltage transmitted to the second spark gap upon breakdown of the triggered first gap is divided across the capacitance of the second gap and the stray capacitance to ground associated with such second gap. Previously, the stray capacitance of the storage modules was purposely made low because otherwide such stray capacitance prevents the high voltage output pulse of the pulser from being of the desired narrow substantially rectangular pulse width of fast rise time and fast fall time. Unfortunately, this low stray capacitance is a disadvantage in overvoltage breakdown since most of the additional voltage produced due to the breakdown of a previous gap is not applied across the subsequent gap but is developed across the stray capacitance associated with such subsequent gap. This often results in failure of the subsequent spark gap to break down unless the gas pressure within the spark gaps is set very close to the "self fire" pressure of such gaps. However, since the gas pressure varies with temperature and the breakdown voltage of a spark gap varies due to roughening or pitting of the gaps during use, it is preferable to set the spark gap gas pressure at an intermediate value in the middle of the pressure range between the self fire pressure and the no fire pressure. It is also desirable to provide this pressure range as wide as possible.

It has been found that the above disadvantages can be overcome by providing the stray capacitance to ground associated with the spark gaps of the first few storage modules forming the input stages of the pulser with a much higher value than the stray capacitance associated with the spark gaps of the output stages of such pulser. Thus, by providing a low stray capacitance at the output stages, narrow high voltage output pulses of fast rise time and fast fall time can still be produced even though a high stray capacitance is provided at the input stages. The high stray capacitance at the input stages causes most of the additional voltage produced by breakdown of earlier gaps to be applied across the succeeding gap because gap capacitance is much smaller than such high stray capacitance. In effect, this provides a wider range of gas pressures between the self fire pressure and the no fire pressure at a given voltage on the spark gaps. When the output pulses of such a Marx surge pulser are applied to an X-ray tube of the field emission cathode type, X-ray pulses of higher radiation intensity are produced due to the narrow width and fast rise time of the high voltage output pulse of the pulser.

These improved results will not be obtained if the pulser is provided with a high stray capacitance throughout, because if the stray capacitance of the output stages is high, much of the energy during the rise time of the output pulse is used to charge the stray capacitance which is then discharged during the fall time of the pulse. This charging and discharging of the high stray capacitance produces an undesirable increase in rise time and fall time of the output pulse. For example, when testing a conventional type Marx surge pulser having a low stray capacitance throughout by spacing the modules from the grounded housing approximately 5½ inches, a pressure range of 4 pounds per square inch (psi) from 19 psi no-fire to 15 psi self-fire pressures was found to exist at a voltage of 8.2 kilovolts in carbon dioxide gas with a spark gap of 0.085 inch. The same pressure range was found even though the stray capacitance was increased by reducing the module to ground spacing to 4 inches. However, by further reducing the size of the housing to provide a module to ground spacing of one inch and form a high stray capacitance, the pressure range was increased to 8 psi extending between 23 psi no-fire and 15 psi self-fire pressures, which is double the pressure range of the previous pulsers. Unfortunately, a resulting high stray capacitance at the output end of the pulser had a deleterious effect on the output pulse waveform so that the intensity of the X-ray pulses produced by an X-ray tube connected to the output of the pulser, was only 22 millirads measured 40 inches from the source. This was approximately one-half the 40 to 42 millirads intensity of the X-ray pulses produced by the pulser of four inch module to ground spacing. However, this disadvantage was overcome when a smaller diameter ground sleeve was inserted into the housing of the first mentioned pulser so that such ground sleeve surrounded the input modules and extended approximately one-third up the length of the module stack. This ground sleeve insert provides a spacing to ground of about one-half inch for the input modules while the spacing to ground for the output modules in the upper two-thirds of the module stack was 5½ inches. Thus, with this last pulser employing the present invention, a pressure range of 8 psi from 23 psi to 15 psi was achieved while the X-ray radiation intensity was increased to about 39 millirads due to the narrow width faster rise time and fall time of the output pulse of such pulser.

It is, therefore, one object of the present invention to provide an improved high voltage pulse generator having a wider pressure range between the self fire and no fire pressure of the gas in the spark gaps of such pulser without greatly increasing the pulse width or the rise time and fall time of the output pulse of such pulser.

Another object of the invention is to provide such a pulser of the Marx surge type in which a high stray capacitance to ground is provided for the input stages and a low stray capacitance to ground is provided for the output stages of such pulser.

A further object of the invention is to provide such a pulser of simple and economical construction which is capable of producing narrow high current, high voltage pulses of fast repetition rate.

Still another object of the invention is to provide such pulser in which the high stray capacitance is provided by a ground sleeve of smaller diameter than the pulser housing, such sleeve surrounding the storage modules containing the input stages of the pulser but extending only along a portion of the stack of modules and not around modules containing the output stages of such pulser.

Still another object of the present invention is to provide such a Marx surge pulser which is suitable for applying high voltage pulses to an X-ray tube of the field emission cathode type to produce X-ray pulses of high intensity and short duration.

BRIEF DESCRIPTION OF THE DRAWINGS

Other objects and advantages of the present invention will be apparent from the following detailed description of a preferred embodiment thereof and from the attached drawings of which.

DESCRIPTION OF PREFERRED EMBODIMENT

Figures 1, 2, 5:
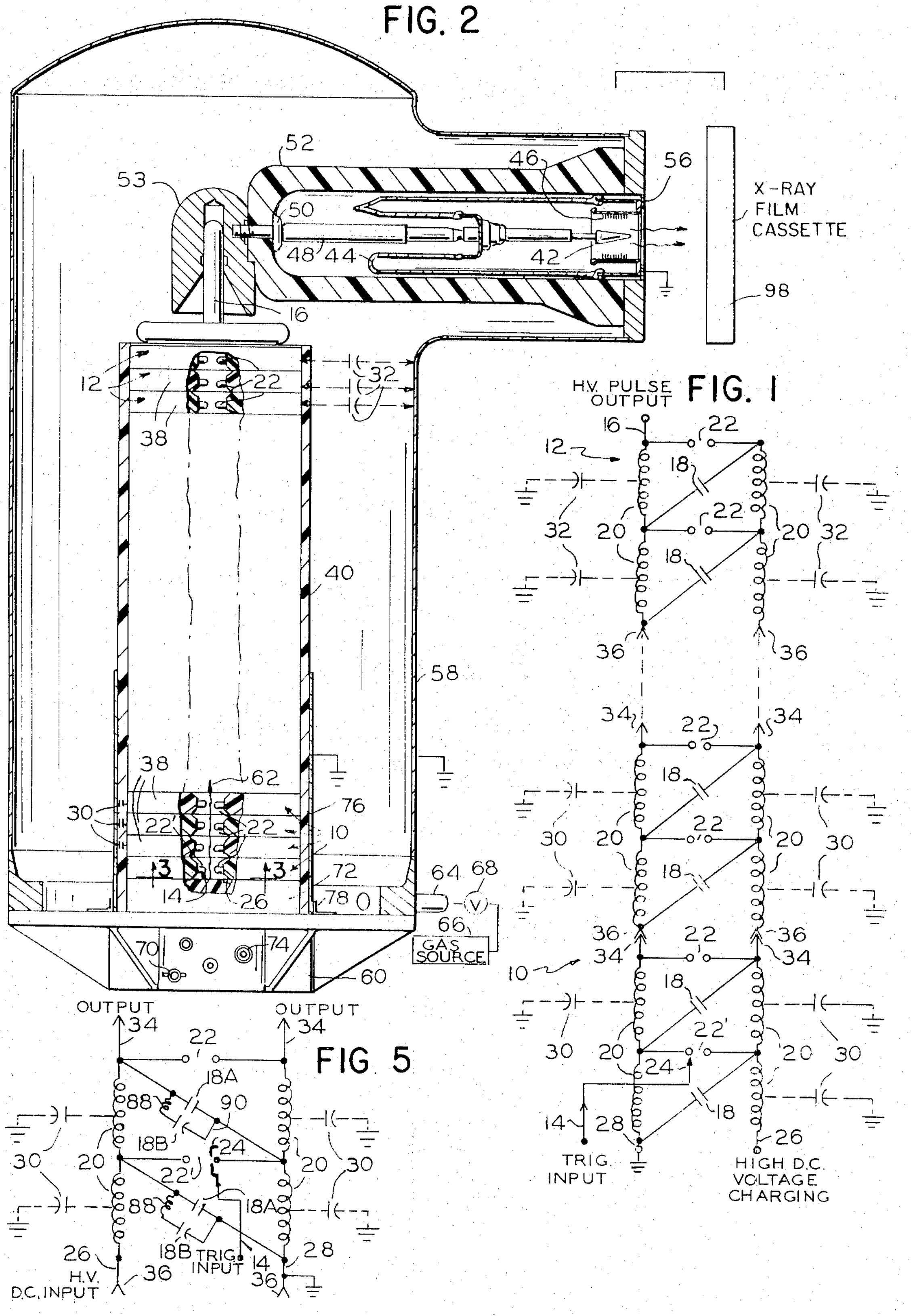
FIG. 1 is a schematic diagram of the electrical circuit of a Marx surge pulser made in accordance with the present invention.
FIG. 2 is a plan view of one embodiment of the Marx surge pulser apparatus of the present invention connected to an X-ray tube of the field emission cathode type, with parts broken away for purposes of clarity.
FIG. 5 is a schematic diagram of the electrical circuit of the storage module of FIGS. 3 and 4.

As shown in FIG. 1, the Marx surge pulser of the present invention includes a plurality of input stages 10 and a plurality of output stages 12, respectively, positioned adjacent the trigger input terminal 14 and a high voltage pulse output terminal 16 of the pulser. Each of these stages includes at least one storage capacitor 18, a pair of isolating inductors 20, and a spark gap 22. All of the spark gaps 22, with the exception of the first gap 22', are formed by a pair of spaced spark gap electrodes which are spaced apart by the same predetermined distance of about 0.090 inch and typically have a gap capacitance of approximately 0.1 picofarad. The first spark gap 22' is also provided with a trigger electrode 24 surrounding a spark gap electrode of reduced diameter, as hereafter discussed with reference to FIG. 6. This trigger electrode is employed to trigger the breakdown of such first spark gap 22' when a trigger pulse is supplied to input terminal 14.

During charging, the storage capacitors 18 of different pulser stages are all connected in parallel through the isolating inductors 20 to a high D.C. voltage source of charging current connected between terminals 26 and 28, the latter of which is grounded, which are provided at the input ends of the isolating conductors 20 of the first pulser stage. Thus, the storage capacitors 18 are charged in parallel to the same D.C. voltage on input 26 which may be, for example, 15 kilovolts. The storage capacitors are discharged in series through the spark gaps 22 when such spark gaps break down to produce a high voltage output pulse of about 300 kilovolts at output terminal 16 for a pulser having 50 stages.

The input stages 10 of the Marx surge pulser of the present invention are provided with a high stray shunt capacitance to ground 30 of, for example, approximately 22 picofarads. This high stray capacitance is much greater than the 0.1 picofarad capacitance of the spark gaps 22 and is also greater than the intermodule capacitance of 19 picfarads formed by the sum of the spark gap capacitance and the capacitance between storage capacitors of adjacent modules hereafter shown in FIGS. 3 to 6. As a result, most of the voltage added to the second stage by the storage capacitor 18 of the first stage when the triggered spark gap 22' breaks down, is applied across the low capacitance of the second spark gap rather than across the high stray capacitance 30 associated therewith. This enables the second spark gap to break down more easily by overvoltage breakdown and the same thing is true of all the remaining input stages having a high stray capacitance including the third and fourth stages shown.

Figure 3:
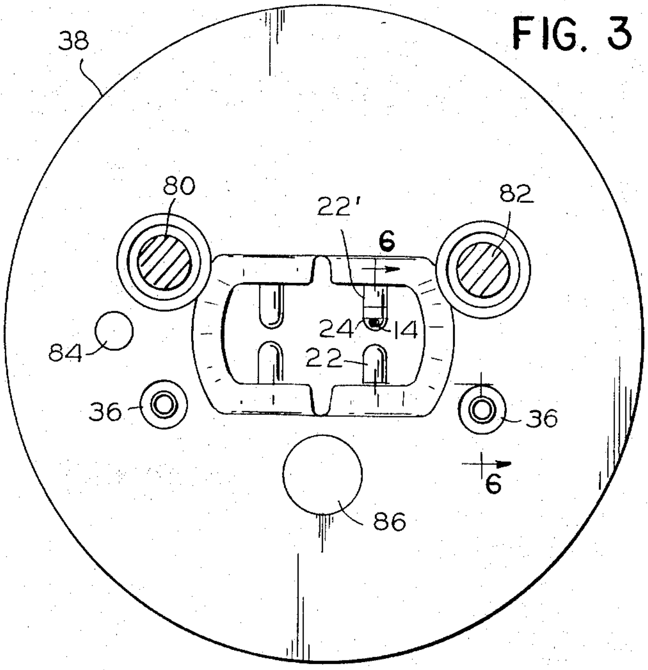
FIG. 3 is an enlarged horizontal section view taken along the line 3—3 of FIG. 2 showing the bottom side of the first storage module of the pulser.
Figure 4:
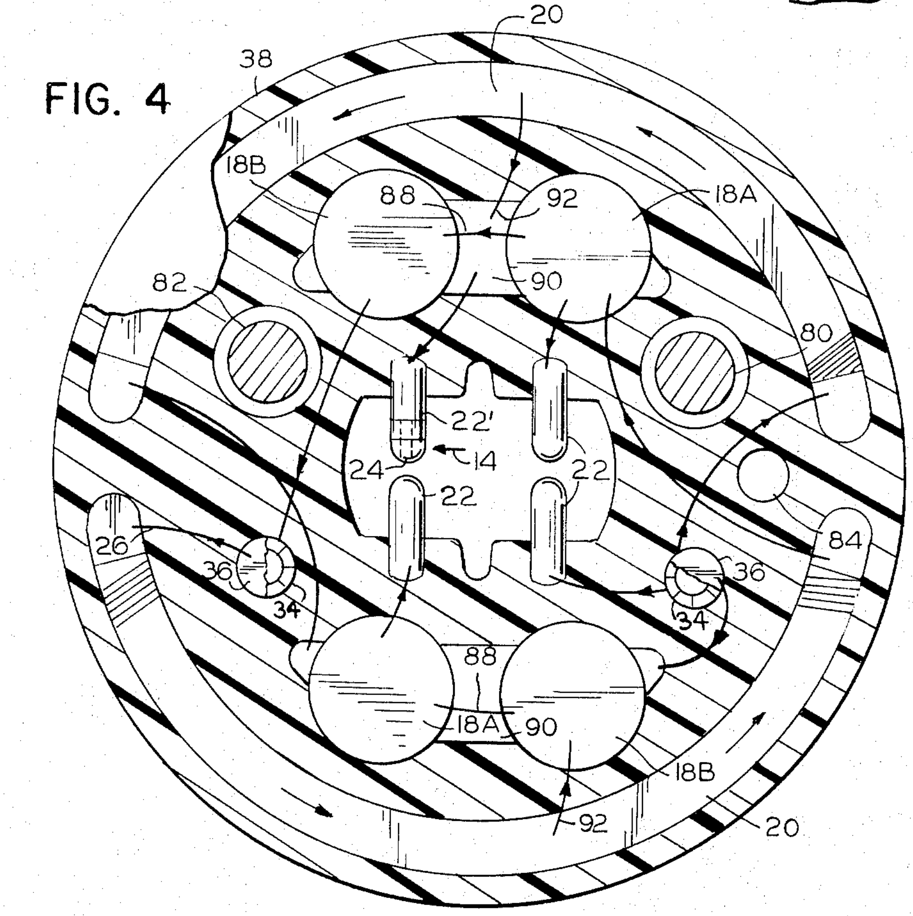
FIG. 4 is a plan view of the top side of the storage module of FIG. 3 with parts broken away to show storage capacitors and isolating inductors contained therein.

It should be noted that the stray capacitance 30, as shown in FIG. 1, is connected between the isolating inductors 20 and ground, rather than between the spark gap electrodes and ground because such isolating inductors are positioned to surround each of the stages in the storage modules containing such stages, hereafter discussed, in FIGS. 3 to 5. In addition, each of the storage capacitors 18 may actually be a pair of capacitors connected in parallel through a small coupling inductance shown in FIG. 5 in order to provide a lumped constant transmission line which produces a more nearly rectangular high voltage output pulse at output terminal 16. However, the present invention is also applicable to Marx surge generators employing a single storage capacitor per stage, as shown in FIG. 1.

The output stages 12 of the Marx surge pulser include low stray shunt capacitances 32 between the isolating inductors 20 and ground. These low stray capacitances may have a capacitance of about 1.2 picofarads and are of a much lower value than the input stray capacitances 30. Such low output stray capacitances 32 are necessary to prevent excess loss of energy and to provide a high voltage output pulse on output terminal 16 of narrow pulse width, as well as fast rise time and fast fall time. In order to accomplish this, the output stray capacitance 32 should be low compared to the output capacitance of the pulser at output terminal 16. In the example given, the pulser output capacitance is approximately 60 picofarads when the storage capacitances 18 are 3,000 picofarads each and 50 stages are employed. Thus, the pulser output capacitance during discharge is the total series capacitance of the storage capacitors, and is given by 3,000 picofarads divided by 50 stages which equals 60 picofarads. Of course, during breakdown the spark gaps 22 have no appreciable capacitance due to the current flow between the gap electrodes which acts as a short circuit. Two pulser stages may be provided in each storage module and the storage modules are connected together in a vertical stack by "snap" type connectors 34 and 36, respectively, on the top and bottom of the modules.

As shown in FIG. 2, one embodiment of the Marx surge pulse generator apparatus of the present invention includes 25 flat, circular, plate-like storage modules 38 each containing two pulser stages, which are supported in a vertical stack. The stack of modules is contained within a dielectric sleeve 40 of polyvinyl chloride or other suitable plastic insulating material having an inner diameter slightly greater than the 6 inch diameter of the modules. The storage modules containing the input stages 10 are positioned at the bottom of the stack while the storage modules containing the output stages are positioned at the top of the stack. Thus, the high voltage pulse output terminal 16 is provided at the top of the module stack and is connected to the anode 42 of an X-ray tube 44 having a field emission cathode 46 in the form of a plurality of spaced needles as shown in the above-cited U.S. Pat. No. 3,256,439. The pulser applies a high voltage output pulse of about 300 kilovolts between the anode and cathode of the X-ray tube to cause it to produce a corresponding pulse of X-rays which are transmitted through a thin metal window closing in the right end of of the tube.

The X-ray tube anode 42, which may be of a conical shape, is connected through a spring-biased telescoping plunger 48 in engagement with a contact member 50 which extends through a tubular plastic wall portion 52 of the housing into engagement with a high voltage connector 53 attached to the output terminal 16 of the pulser. The X-ray tube 44 is held within a chamber 54 formed within the plastic member 52 by means of a retaining ring 56 which can be easily removed for replacement of the tube.

The storage modules 38 are supported in a vertical stack on a pair of alignment rods extending through apertures in such modules within a hollow metal housing 58. The housing is closed at its bottom end by a cover plate 60 to which the module stack is attached. Such housing is hermetically sealed and is filled with carbon dioxide or nitrogen or other suitable gas at greater than atmospheric pressure of, for example, approximately 20 pounds per square inch. This operating pressure is approximately midway between the self fire pressure and the no fire pressure of the spark gaps 22 at the D.C. charge voltage. It should be noted that the spark gaps 22 are positioned in vertical alignment along a common light path so that ultraviolet light 62 emitted from the ionized gas of the first spark gap 22' travels down such light path through all the remaining spark gaps to aid in breakdown of such spark gaps. Thus, after triggering of the first spark gap 22' by applying a trigger pulse to the trigger input 14, all of the remaining spark gaps break down by a combination of overvoltage and ultraviolet radiation. The gas may be pumped into the housing 58 through a connector pipe 64 located at the bottom of the housing from an external gas source 66 which is connected through a valve 68 to such pipe.

A trigger input connector 70 may be provided on the bottom cover plate 60 and is electrically connected to a pulse transformer contained within a bottom trigger module 72 below the first storage module. The trigger module 72 has a spring-biased plunger forming the trigger input contact 14 extending from its upper surface into engagement with the trigger electrode 24 of the first spark gap 22' for applying trigger pulses thereto. In addition, a charging input connector 74 may be provided on the cover plate member 60 and electrically connected through the connector terminals 26 and 28 of FIG. 1 provided on the top surface of the bottom module 72 for applying charging current to the storage modules from an external D.C. voltage source.

A grounded cylindrical metal sleeve 76 is provided around the lower storage modules 38 of the input pulser stages 10 and extends upward from the bottom module 72 approximately one-third the length of the module stack. This ground sleeve 76 is electrically connected to ground by brackets 78 which are bolted to the cover plate 60 of the housing. The ground sleeve 76 is spaced from the storage modules 38 of the input stages 10 by the dielectric sleeve 40 a short distance of less than one inch. Thus, for example, when the storage modules 38 are 6 inches in diameter, the inner diameter of the ground sleeve 76 is 6⅝ inches which gives a spacing of five-sixteenths inch between the modules and the ground sleeve. However, the isolation inductors 20 within the storage modules are spaced slightly from the outside of the modules so that the effective outside diameter of the modules to the outside of the inductors is only 5¾ inches. Thus, the stray capacitance per unit length of the input modules 10 is approximately 360 picofarads per foot and each module is approximately three-fourths inch thick so that for this example, the high stray capacitance 30 between the modules of the input stage and the ground sleeve is approximately 22 picofarads. However, the output stray capacitance 32 is much lower due to the greater spacing between the storage modules of the output stages 12 and the grounded metal housing 58 because the ground sleeve 76 extends less than one-half the total length of the module stack. Thus, when the metal housing 58 has an inner diameter of 13¾ inches, the stray capacitances per unit length associated with the upper modules of the output stages 12 not surrounded by the ground sleeve 76 is approximately 20 picofarads per foot, so that for three-fourths inch thick modules the stray capacitance 32 for each module is 1.2 picofarads. It should be noted that the dielectric constant of the plastic sleeve 40 is greater than that of the gas within the housing which, in addition to the low module to ground spacing of the input modules, further increases the capacitance of the input stray capacitance 30 over that of the output stray capacitance 32.

As shown in FIGS. 3 to 6, each of the storage modules 38 include a pair of openings having alignment rods 80 and 82 extending therethrough, as well as a third opening 84 for orientation and other purposes. In addition, each storage module includes a spacer projection 86 to accurately space it from its adjacent module.

As shown in FIGS. 4 and 5, each of the storage modules 38 contains two pulser stages including a storage capacitance 18 which is actually formed by a pair of storage capacitors 18A and 18B connected in parallel through a coupling inductance 88 and a conductor 90 attached between the top and bottom terminals respectively of such capacitors. Thus, the two capacitors 18A and 18B, and the coupling inductance 88 form a lumped constant transmission line of substantially uniform characteristic impedance which produces a rectangular high voltage output pulse at output 16. The isolating inductors 20 are large arcuate shaped inductances formed by wires wound about core rods of insulating material which are positioned adjacent the periphery of the storage module. Each of the inductors is center tapped by leads 92 to provide the two isolating inductors 20 which are connected to the high voltage D.C. input 26 and to the ground input 28.

Figure 6:
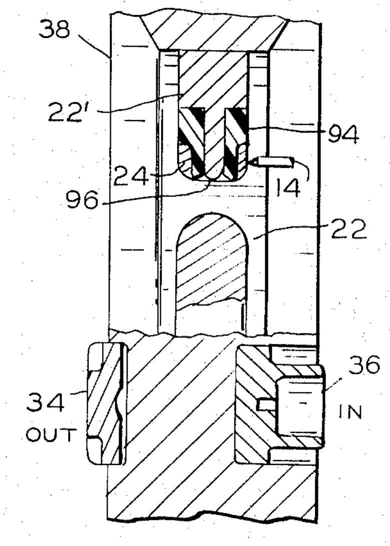
FIG. 6 is an enlarged section view taken along the line 6—6 of FIG. 4 showing the trigger electrode and the connecting terminals of the storage module.

As shown in FIG. 6, the triggered spark gap 22' includes a trigger electrode 24 in the form of a hollow cap supported on an insulating sleeve 94 surrounding a tip portion 96 of reduced diameter extending from the end of one of the main spark gap electrodes. Thus, when a trigger pulse is transmitted through a spring biased plunger 14 in contact with the trigger electrode 24, a first breakdown initially occurs between such trigger electrode and the tip portion 96 of the spark gap electrode 22', and then a second breakdown causing the main current discharge occurs between tip portion 96 and the other spark gap electrode 22. In this regard, see a similar trigger electrode arrangement in U. S. Pat. No. 3,256,439 of Dyke et al., referred to previously.

The Marx surge pulser of FIGS. 1 and 2 produces high voltage output pulses of 300 kilovolts peak voltage and 1,000 amperes current with a pulse width of about 30 nanoseconds at output terminal 16. The pulser may be rapidly charged and discharged at a fast rate of up to 1,000 pulses per second which is a great advantage for pulsed X-ray apparatus such as that used for high speed radiology in which a plurality of X-ray pulses are transmitted to a radiographic film supported in a film cassette 98 for each film exposure.

As a result of the high stray capacitance for the input pulser stages which causes higher voltages to be transferred to spark gaps of such input stages, it is believed that the ultraviolet light emitted from such spark gaps during their breakdown is of greater intensity which further aids in the breakdown of subsequent gaps.

It will be obvious to those having ordinary skill in the art that many changes may be made in the above-described preferred embodiment of the present invention without departing from the spirit of the invention. For example, the high stray capacitance associated with the input stages can actually be provided by separate discrete shunt capacitors, rather than distributed stray capacitance. For this reason, the term "shunt capacitance" is used in the claims to cover both types of capacitance. In addition, the ground sleeve can be of a frustroconical shape rather than a cylindrical shape so that the spacing between such ground sleeve and the storage modules gradually increases with distance from the input at the bottom of the sleeve in order to cause the stray capacitance to gradually reduce in value. Therefore, the scope of the present invention should only be determined by the following claims.

I claim:

1. A high voltage pulse generator apparatus which comprises:

a plurality of energy storage modules containing storage capacitors and isolation inductors, and said storage modules forming input stages and output stages of said pulse generator apparatus;

charge means for charging said storage capacitors in parallel through said isolation inductors to a predetermined D.C. voltage;

discharge means for discharging said storage capacitors in series through spark gaps including a plurality of spark gap electrodes attached to said modules and connected to said storage capacitors;

a housing containing said storage modules and the spark gaps and containing gas under pressure at least in said spark gaps;

trigger means for causing at least the first spark gap of the input stage at the input end of the pulse generator to break down in order to discharge said storage capacitors and produce a high voltage output pulse across the last spark gap of the output stage at the output end of said pulse generator; and shunt capacitance means including a first grounded conductive means provided within said housing and surrounding the input stages for connecting the spark gap electrodes of a plurality of successive spark gaps of said input stages beginning with the first spark gap, to ground, through high shunt capacitances of greater capacitance than the spark gap capacitance, and a second grounded conductive means surrounding the output stages for connecting the spark gap electrodes of a plurality of other successive spark gaps of said output stages ending with the last spark gap to ground through low shunt capacitances, said first conductive means positioned closer to the storage modules of said input stages than said second conductive means is spaced from the storage modules of said output stages so said high shunt capacitance is several times said low shunt capacitance.

2. A pulse generator in accordance with claim 1 in which said spark gaps are positioned along a common light path and the gas in the spark gap emits ultraviolet light when it breaks down.

3. A pulse generator in accordance with claim 1 in which the storage modules are positioned in a stack and the shunt capacitance means includes a grounded conductor sleeve surrounding the input end portion of said stack and insulatingly spaced from said stack.

4. A pulse generator in accordance with claim 3 in which the sleeve extends less than one-half the length of said stack and the high shunt capacitances are formed by the stray capacitance between said sleeve and said storage modules.

5. A pulse generator in accordance with claim 4 in which housing includes a grounded shield member spaced a greater distance from said stack than said sleeve and the low shunt capacitances are formed by the stray capacitance between said housing and said modules.

6. A pulse generator in accordance with claim 1 in which the storage capacitors and isolation inductors are connected as a Marx surge generator circuit.

7. A pulse generator apparatus in accordance with claim 1 in which the last spark gap is connected to a field emission X-ray tube for applying said high voltage output pulse between a field emission cathode and an anode in said tube to produce a corresponding X-ray pulse.

8. A pulse generator apparatus in accordance with claim 7 in which the X-ray tube has a field emission cathode in the form of a plurality of sharp needles.

9. A pulse generator apparatus in accordance with claim 8 which also includes a control means for causing the charge means and the discharge means to operate at a fast rate of at least 1,000 pulses per second to produce a pulse train including a predetermined number of high voltage output pulses of at least 300 kilovolts amplitude, and to apply said pulse train to said X-ray tube to produce a plurality of X-ray pulses.

10. A pulse generator apparatus in accordance with claim 9 which also includes means for supporting a radiographic film adjacent said X-ray tube so that said film is exposed by said plurality of X-ray pulses.

* * * * *